US010089046B2

(12) United States Patent
Taniguchi

(10) Patent No.: US 10,089,046 B2
(45) Date of Patent: Oct. 2, 2018

(54) RECEIPT PRINTING SYSTEM, CONTROL METHOD OF A RECEIPT PRINTING SYSTEM, AND CONTROL DEVICE

(71) Applicant: Seiko Epson Corporation, Tokyo (JP)

(72) Inventor: Takaaki Taniguchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 98 days.

(21) Appl. No.: 14/647,551

(22) PCT Filed: Dec. 2, 2013

(86) PCT No.: PCT/JP2013/007047
§ 371 (c)(1),
(2) Date: May 27, 2015

(87) PCT Pub. No.: WO2014/091707
PCT Pub. Date: Jun. 19, 2014

(65) Prior Publication Data
US 2015/0331646 A1    Nov. 19, 2015

(30) Foreign Application Priority Data

Dec. 13, 2012 (JP) .................................. 2012-272091

(51) Int. Cl.
*G06F 3/12* (2006.01)
(52) U.S. Cl.
CPC .......... *G06F 3/1254* (2013.01); *G06F 3/1203* (2013.01); *G06F 3/125* (2013.01); *G06F 3/1224* (2013.01); *G06F 3/1289* (2013.01)

(58) Field of Classification Search
CPC ...... G06F 3/1204; G06F 3/0659; G06F 3/123; G06F 3/1208; G06F 3/1289;
(Continued)

(56) References Cited

U.S. PATENT DOCUMENTS 7,065,564 B2 * 6/2006 Machida ............... G06F 9/4411
358/1.15
7,613,284 B2 * 11/2009 New ..................... G06Q 20/20
379/93.12
(Continued)

FOREIGN PATENT DOCUMENTS

JP    2003-157174 A    5/2003
JP    2003-167711 A    6/2003
(Continued)

*Primary Examiner* — Fan Zhang
(74) *Attorney, Agent, or Firm* — Foley & Lardner LLP

(57) ABSTRACT

Content of a configuration file stored by a control device can be changed easily in a short time. A printing system has a host computer including a print control unit that generates and sends a control command causing printing referenced to a configuration file to a printer using a printing port, and a settings changing unit that changes settings information based on the change settings command when a change settings command instructing changing settings information in the configuration file is input from the server device using a configuration port; and a management server including a change settings command unit that, for a specific one or plural connected host computers, generates a change settings command related to the configuration file, and sends the change settings command to each host computer using a configuration port that is opened by each host computer.

19 Claims, 4 Drawing Sheets

(58) Field of Classification Search
CPC .. G06K 15/1805; G06Q 20/20; G06Q 20/202;
G06Q 20/209; G06Q 20/201; G07G 1/14;
G07G 1/0009
See application file for complete search history.

(56) References Cited

U.S. PATENT DOCUMENTS

| | | | | |
|---|---|---|---|---|
| 7,783,572 | B2* | 8/2010 | Fang | G06Q 20/3552 |
| | | | | 705/50 |
| 8,259,315 | B2* | 9/2012 | Ebuchi | G06F 3/1204 |
| | | | | 358/1.13 |
| 8,339,634 | B2* | 12/2012 | Kennis | G06F 3/1204 |
| | | | | 358/1.15 |
| 8,863,147 | B2* | 10/2014 | Meckenstock | G06Q 20/20 |
| | | | | 719/310 |
| 9,064,251 | B2* | 6/2015 | Lal | G06Q 20/204 |
| 2004/0019495 | A1* | 1/2004 | Fukano | G07G 1/14 |
| | | | | 705/24 |
| 2004/0105126 | A1* | 6/2004 | Minowa | B42D 15/00 |
| | | | | 358/1.18 |
| 2004/0112236 | A1* | 6/2004 | Yokoyama | B42D 15/00 |
| | | | | 101/483 |
| 2007/0043805 | A1 | 2/2007 | Izaki et al. | |
| 2007/0182978 | A1* | 8/2007 | Nakamura | G06F 3/1206 |
| | | | | 358/1.13 |
| 2008/0259398 | A1 | 10/2008 | Osuka et al. | |
| 2010/0159907 | A1* | 6/2010 | Farley | G06Q 20/20 |
| | | | | 455/418 |
| 2010/0195132 | A1* | 8/2010 | Takashima | G06F 3/1205 |
| | | | | 358/1.13 |
| 2014/0044004 | A1* | 2/2014 | Oda | H04L 41/5067 |
| | | | | 370/253 |

FOREIGN PATENT DOCUMENTS

| | | |
|---|---|---|
| JP | 2004-145861 A | 5/2004 |
| JP | 2007-011700 A | 1/2007 |
| JP | 2008-269265 A | 11/2008 |
| JP | 2009-081582 A | 4/2009 |
| JP | 2010-074414 A | 4/2010 |
| JP | 2012-208766 A | 10/2012 |

\* cited by examiner

RECEIPT PRINTING SYSTEM, CONTROL METHOD OF A RECEIPT PRINTING SYSTEM, AND CONTROL DEVICE

TECHNICAL FIELD

The present invention relates to a receipt printing system including one or a plurality of control devices that control a printer, and a server device connected to the control devices, to a control method of the receipt printing system, and to the control device.

BACKGROUND

Printing systems that have a printing device (printer) and a control device (print data generating device), and print by the control device using a function of a printer driver to reference a configuration file to generate print data and send the print data to the printing device are known from the literature (see, for example, PTL 1).

CITATION LIST

Patent Literature

[PTL 1] JP-A-2008-269265

SUMMARY OF INVENTION

Technical Problem

This type of printing system is configured with plural sets of printers and control devices. For example, a printing system deployed in a store such as a supermarket has a printer for printing receipts and a control device that functions as a POS terminal installed at each checkout register. The content of the configuration file stored by each of the plural control devices in this printing system may also be changed for all control devices. In this event, it is desirable to complete the change as easily as possible in a short time.

The present invention is directed to the foregoing problem, and an objective of the invention is to enable changing the content of the configuration file stored by the control devices easily and in a short time.

Solution to Problem

To achieve the foregoing objective, the invention is a receipt printing system including one or plural control devices that control a connected receipt printer, and a server device connected to the control device. The control device includes a print control unit that generates a control command for printing by referencing a configuration file containing printing-related settings information, and sending the control command to the receipt printer using a printing port, which is a logical port opened for sending data to the receipt printer, and a settings changing unit that changes the settings information based on the change settings command when a change settings command instructing changing settings information in the configuration file is input from the server device using a configuration port, which is a logical port separate from the printing port. The server device includes a change settings command unit that, for a specific one or plural control devices in the group of connected control devices, generates a change settings command related to the configuration file stored in each control device, and sends the change settings command to each control device using a configuration port, which is opened by each control device.

Thus comprised, a dedicated configuration port to which a change settings command from the server device is input is opened separately to the printing port for outputting control commands for printer control, and to change the configuration files of plural control devices, the content of the configuration file of each control device can be changed by the server device sending a change settings command instructing changing the settings information of the configuration file through a configuration port opened by each control device. As a result, when compared with methods of the related art that make changes manually through manual means, changes can be made to the configuration file of each control device in which the configuration file should be changed more easily and in less time.

The invention is further characterized by the change settings command unit of the server device requesting the connected control device to send information identifying the receipt printer connected to the control device, displaying the information identifying the receipt printer received in response to the request in a format enabling selecting desired information, and generating the change settings command for the configuration files related to the printers corresponding to the selected information, before sending the change settings command.

Thus comprised, user convenience is improved because the user can manually confirm the printers corresponding to the configuration files with content to be changed, and can identify the receipt printers corresponding to the configuration files with content to be changed by the simple means of selecting the desired information from the information identifying the receipt printers displayed in a selectable manner instead of performing a complicated task of inputting information identifying each receipt printer to the server device.

To achieve the foregoing objective, another aspect of the invention is a control method of a receipt printing system including one or plural control devices that control a connected receipt printer, and a server device connected to the control device, the control method including: the server device generating a change settings command instructing changing printing-related settings information written in a configuration file stored in the control device for a specific one or plural control devices in the group of connected control devices, and sending the change settings command to each control device using a configuration port, which is a logical port opened by each control device; and the control device changing the settings information based on the change settings command when the change settings command is input from the server device using the configuration port.

Thus comprised, a dedicated configuration port to which a change settings command from the server device is input is opened separately to the printing port for outputting control commands for receipt printer control, and to change the configuration files of plural control devices, the content of the configuration file of each control device can be changed by the server device sending a change settings command instructing changing the settings information of a configuration file through a configuration port opened by each control device. As a result, when compared with methods of the related art that make changes manually through manual means, changes can be made to the configuration file of each control device that should be changed more easily and in less time.

To achieve the foregoing objective, another aspect of the invention is a control device that is connected to a receipt printer and controls the receipt printer, and is connected to a server device, the control device having: a print control unit that generates a control command for printing by referencing a configuration file containing printing-related settings information, and sending the control command to the receipt printer using a printing port, which is a logical port opened for sending data to the receipt printer, and a settings changing unit that changes the settings information based on the change settings command when a change settings command instructing changing settings information in the configuration file is input from the server device using a configuration port, which is a logical port separate from the printing port.

Thus comprised, a dedicated configuration port to which a change settings command from the server device is input is opened separately to the printing port for outputting control commands for printer control, and to change the configuration files of plural control devices, the content of the configuration file of each control device can be changed by the server device sending a change settings command instructing changing the settings information of a configuration file through a configuration port opened by each control device. As a result, when compared with methods of the related art that make changes manually through manual means, changes can be made to the configuration file of each control device that should be changed more easily and in less time.

Advantageous Effects of Invention

The invention enables changing a configuration file stored by control devices easily and in a short time.

DESCRIPTION OF EMBODIMENTS

An embodiment of the invention is described below with reference to the accompanying figures.

Figure 1:
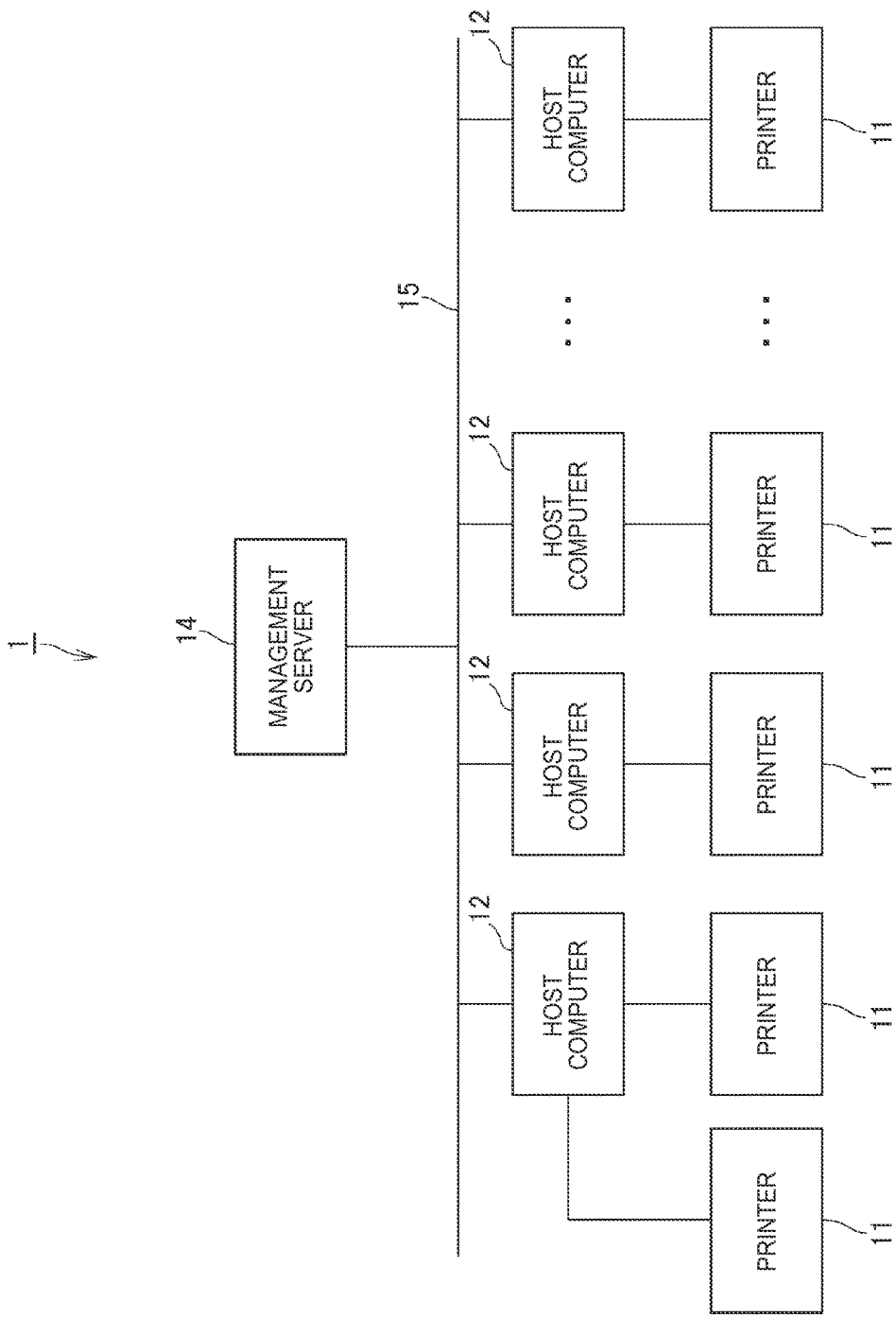
FIG. 1 illustrates the configuration of a receipt printing system according to an embodiment of the invention.

FIG. 1 illustrates the configuration of a printing system (receipt printing system) 1 according to this embodiment.

The printing system 1 is a so-called POS system used in retail businesses such as shopping centers, supermarkets, and convenience stores, and at least has a function for producing receipts for customers who have completed a transaction such as buying merchandise in a store.

The printing system 1 has plural printers 11 (receipt printers) that can produce receipts. Connected to each of the printers 11 is a host computer 12 (control device) that is used as a so-called POS terminal and controls the printer 11 to produce receipts. A printer 11 and host computer 12 are installed at each of the plural checkout counters in a store. The printer 11 produces a specific receipt at a specific time as controlled by the host computer 12. As shown in FIG. 1, plural printers 11 may be connected instead of just one printer 11 to a single host computer 12.

As shown in FIG. 1, the printing system 1 also has a management server 14 (server device). The management server 14 is a server that functions as a so-called POS server to centrally manage the printing system 1, and stores databases storing data required to produce receipts, such as product master and customer master databases. The management server 14 is communicatively connected to each of the host computers 12 through a LAN or other network 15.

Figure 2:
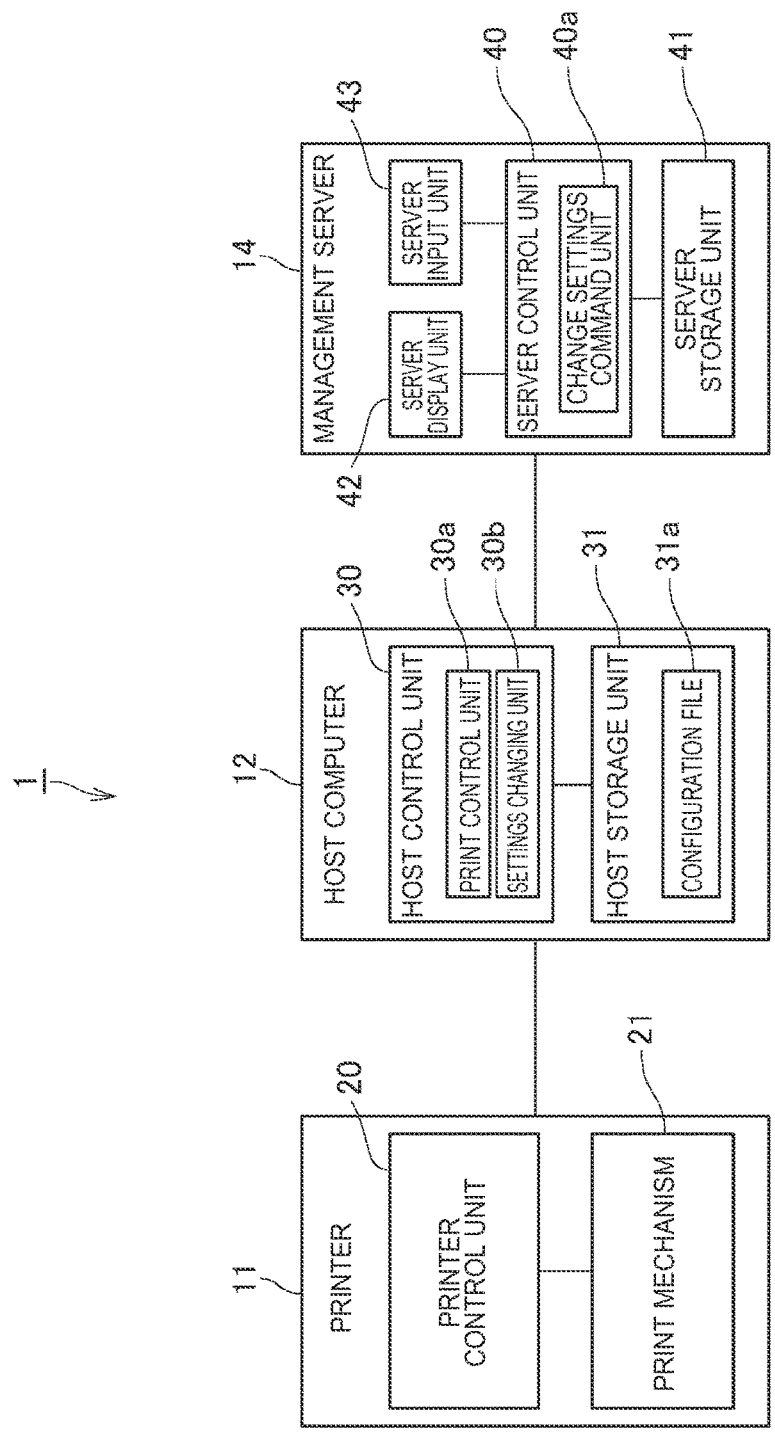
FIG. 2 is a block diagram illustrating the configuration of devices in the receipt printing system.

FIG. 2 is a block diagram illustrating the functional configuration of the printer 11, host computer 12, and management server 14.

As shown in FIG. 2, the printer 11 has a printer control unit 20 and a print mechanism 21.

The printer control unit 20 centrally controls other parts of the printer 11, and includes a CPU as an execution unit, ROM that nonvolatilely stores firmware run by the CPU and data used by the firmware, RAM used as working memory, and other peripheral circuits. The print mechanism 21 includes various mechanisms including a thermal head for recording images on thermal roll paper stored in the printer 11, a conveyance mechanism for conveying the thermal roll paper, and a cutter mechanism for cutting the thermal roll paper.

Based on control commands received from the host computer 12, the printer control unit 20 produces receipts, which are tickets on which specific images are recorded, by monitoring output from various sensors and controlling the thermal head, conveyance mechanism, and cutter mechanism, to record specific images on the thermal roll paper and then cutting the thermal roll paper at a specific position.

As shown in FIG. 2, the host computer 12 has a host control unit 30 and a host storage unit 31.

The host control unit 30 centrally controls other parts of the host computer 12, and includes a CPU, ROM, RAM, and other peripheral circuits. The host control unit 30 includes a print control unit 30a and a settings changing unit 30b, and these function blocks are described further below.

The host storage unit 31 is EEPROM, a hard disk drive, or other nonvolatile memory, and nonvolatilely stores data rewritably. A configuration file 31a is stored in the host storage unit 31. The configuration file 31a is a file in which configuration information related to printing is stored. This printing-related configuration information is information indicating settings related to printing by the printer 11, such as the paper width, print speed, top, bottom, left and right margins, and the print density. The configuration file 31a is a file that can be referenced by the printer driver that embodies the function of the print control unit 30a described below. To generate control commands for controlling the printer 11, the print control unit 30a references the configuration file 31a as needed and generates control commands conforming to the settings related to printing by the printer 11.

As also shown in FIG. 2, the management server 14 includes a server control unit 40, a server storage unit 41, a server display unit 42, and a server input unit 43.

The server control unit 40 centrally controls other parts of the management server 14, and includes a CPU, ROM, RAM, and other peripheral circuits. The server control unit 40 also has a change settings command unit 40a, and this function block is described further below. The server storage unit 41 is a hard disk drive or other nonvolatile memory, and stores databases such as product master and customer master databases, and other data. The server display unit 42 includes an LCD panel or other display panel, and displays images on the display panel as controlled by the server control unit 40. The server input unit 43 is connected to input means such as a keyboard and switches, detects input to the input means, and outputs to the server control unit 40.

The basic operation of the host computer 12 and printer 11 when working together to produce a receipt is described next.

Figure 3:
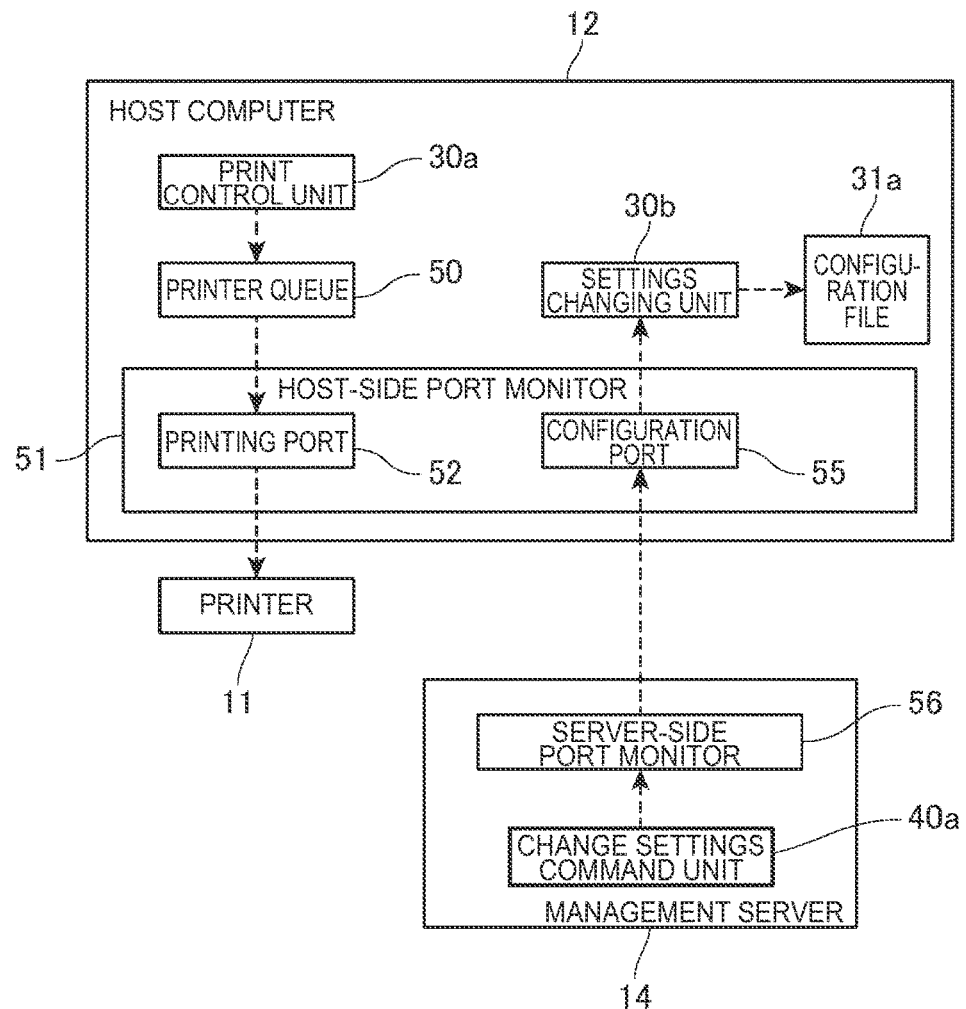
FIG. 3 is a function block diagram of main parts of the receipt printing system.

To describe communication between the printer 11, host computer 12, and management server 14, FIG. 3 schematically describes the components of these devices related to communication in a manner suited to describing communication therebetween. To simplify the description, FIG. 3 shows the function blocks (blocks conceptually expressing the functions rendered by running programs), the programs, logical ports, and data on the same level.

An application (a so-called POS application program) that generates and outputs information related to the images to be recorded on a receipt, and a printer driver that generates control commands conforming to the command language of the printer 11 based on the information related to the images to be recorded on a receipt output by the application, are installed on the host computer 12. Based on the reading results from a barcode reader or card reader not shown, the application acquires necessary information from the management server 14 as needed, and gets the information related to the images to be recorded on the receipt.

The print control unit 30a of the host control unit 30 is a function block that is rendered by the CPU reading and running the application, printer driver, and associated programs.

To produce a receipt, the print control unit 30a of the host control unit 30 of the host computer 12 generates control commands causing the printer 11 to execute operations for producing a receipt by functions of the application and printer driver. The generated control commands are temporarily stored in a printer queue 50 created in a specific storage area. This printer queue 50 is created for each printer 11 when plural printers 11 are connected to the host computer 12. Each printer queue 50 is relationally stored with information identifying the corresponding printer 11, such as information identifying the physical port to which the printer 11 is connected (such as the number of the physical port), or a name uniquely assigned to the printer 11.

As shown in FIG. 3, a host-side port monitor 51 is installed on the host computer 12. The host-side port monitor 51 is a component for sending printing-related control commands to the printer 11, and may be a TCP/IP port monitor, for example.

The host-side port monitor 51 functions to open a printing port 52, which is a logical port, and then manage the printing port 52 that was opened, after assigning a unique port name to each combination of printer 11 address on the network 15, port number to be specified when sending data, and communication protocol used to send data. Note that the address, port number, communication protocol to use, and port name may be input by the user through a specific user interface, may be default values, or may be set automatically by acquiring specific information.

A printing port 52 is first opened by a function of the host-side port monitor 51 for each printer 11 connected to the host computer 12. To then send control commands to any single printer 11, the control commands temporarily stored in the printer queue 50 are sequentially sent by cooperation with a communication interface not shown to the printer 11 using the printing port 52 corresponding to the one printer 11, the appropriate port number specified for the appropriate address, and using the appropriate communication protocol. As described further below, a configuration port 55 to the management server 14 is also opened by a function of the host-side port monitor 51. A server-side port monitor 56 is also installed on the management server 14. The printer control unit 20 of the printer 11 controls the print mechanism 21 and produces a receipt based on the received control commands.

In the printing system 1 according to this embodiment, a host computer 12 and one or more printers 11 are installed at each of the plural checkout counters in a store. Each printer 11 produces receipts as controlled by the corresponding host computer 12. In this type of system, there are times when the format of the printout must be changed (=changing the content of the configuration file 31a on the corresponding host computer 12) at the same time for each of the plural printers 11. For example, the format of the appearance of the receipts produced in a store may be globally changed uniformly for all receipts by changing the line spacing globally, or changing the top, bottom, left and right margins globally.

In such cases, an administrator has conventionally gone to where the host computer 12 for which the content of the configuration file 31a must be changed is installed and changed the content of the configuration file 31a by making the necessary inputs to a user interface provided by a function of the printer driver or other program, or connected a terminal on which is installed a specific software tool having the ability to change the content of the configuration file 31a to the host computer 12 and changed the content of the configuration file 31a by a function of the software tool, and both of these are complicated tasks.

As a result, the devices of the printing system 1 according to this embodiment execute the following operation.

Figure 4:
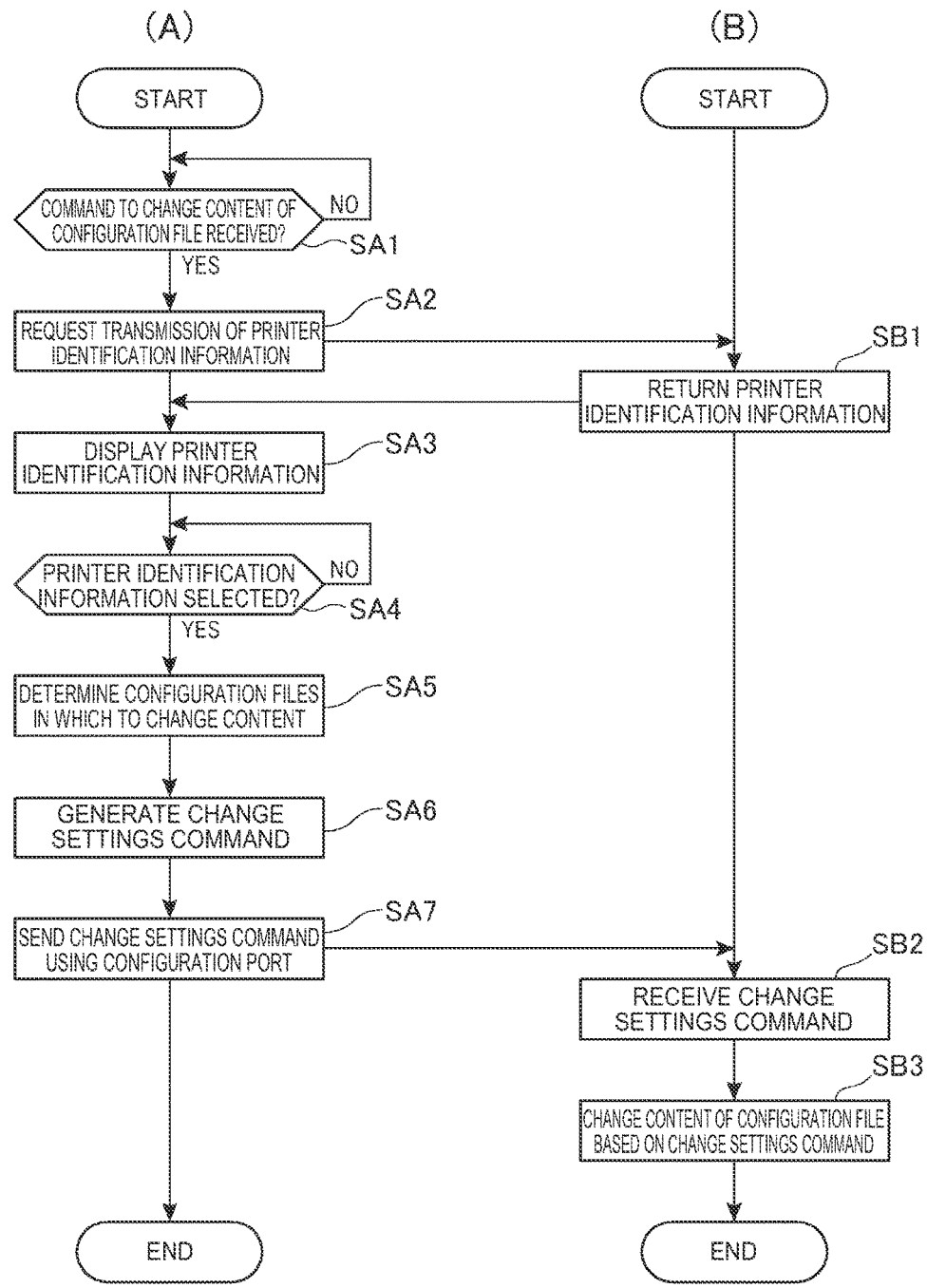
FIG. 4 is a flow chart illustrating the operation of devices in the receipt printing system.

FIG. 4 is a flow chart showing the operation of the management server 14 and the host computer 12, particularly the operation of these devices when changing the content of the configuration file 31a stored in the host computer 12, (A) showing the operation of the management server 14 and (B) showing the operation of the host computer 12.

The function of the change settings command unit 40a and settings changing unit 30b described below is realized by the cooperation of hardware and software, such as CPUs reading and executing programs.

First, the change settings command unit 40a of the server control unit 40 of the management server 14 monitors whether or not a user has issued a command to change the configuration file 31a (step SA1). Note that a user interface for inputting a command to change the configuration file 31a is provided by a function of a specific program, and the user issues the command using an input means of the server input unit 43.

If there is a command to change the configuration file 31a (step SA1 returns YES), the change settings command unit 40a requests all host computers 12 connected to the network 15 to send identification information for each printer 11 connected to each host computer 12 (information identifying each printer) (step SA2). The protocol used for the request is determined in advance.

The settings changing unit 30b of the host control unit 30 of each host computer 12 acquires the identification information for each connected printer 11, and returns the acquired identification information to the management server 14 (step SB1). As described above, a printer queue 50 is created for each connected printer 11 in the host computer 12, and identification information for the printer 11, such as information identifying the physical port to which the printer 11 is connected (such as the number of the physical port), or a name uniquely assigned to the printer 11, is stored for each printer queue 50. As a result, each host computer 12 can return the identification information of the printer 11 related to each printer queue 50.

When identification information for the printers 11 is received from the host computers 12, the change settings command unit 40a of the management server 14 controls the server display unit 42 to display a specific user interface on the display panel and displays the acquired printer 11 identification information in a specific format in the user interface (step SA3). The user interface enables the user to select the desired identification information (one or more) from the displayed printer 11 identification information. The printer 11 identification information displayed in the user interface relates to all printers 11 in the printing system 1.

Next, the change settings command unit 40a checks if printer 11 identification information displayed in the user interface was selected by the user (step SA4). If printer 11 identification information is selected by the user (step SA4 returns YES), the change settings command unit 40a identifies the configuration files 31a of the printers 11 corresponding to the selected identification information as the configuration files 31a of which the content is to be changed (step SA5).

For each configuration file 31a identified in step SA5, the change settings command unit 40a generates a change settings command instructing changing the settings information stored in each file (step SA6). Note that the user interface for inputting specifically how to change the settings information is provided by a function of a specific program on the management server 14. The user inputs the specific changes to be made to the settings information through the user interface at a suitable time before the process of step SA6 executes, such as when entering the change settings command in step SA1. For example, the user may command changing the left margin from 8 dots to 10 dots through the user interface, or the user may command changing the print speed from medium to high speed through the user interface.

Based on the specific changes to be made to the settings information specified by the user, the change settings command unit 40a generates a change settings command conforming to the specific command language to change the settings information written in the configuration file 31a in step SA6.

Next, the change settings command unit 40a sends the generated change settings command using the configuration port 55 corresponding to the configuration file 31a in which to change the content (step SA7).

The configuration port 55, and the process of step SA7, are described below.

The configuration port 55 is a logical port dedicated to transmission of change settings commands by the management server 14, and is opened and managed by a function of the host-side port monitor 51 on each host computer 12. A configuration port 55 is opened for the configuration file 31a of each printer 11 connected to the host computer 12, and identification information for the corresponding printer 11 is stored for each configuration port 55. The address for sending the change settings command from the management server 14 to the host computer 12, port number, and communication protocol set is appropriately set for each configuration port 55.

To send a change settings command instructing changing the content of the configuration file 31a of a particular printer 11 in step SA7, the change settings command unit 40a of the management server 14 sends a request for transmission of information about the configuration port 55 that is set for the configuration file 31a of the particular printer 11 to the host computer 12 to which the particular printer 11 is connected using the identification information of the particular printer 11 as the search key. Next, using a function of the server-side port monitor 56, which is a previously installed port monitor, the change settings command unit 40a sends the change settings command using the configuration port 55 based on the configuration port 55 information acquired in response to the above request. As a result, an appropriate port number is specified and an appropriate communication protocol is used for the appropriate address to send a change settings command to the host computer 12.

For each configuration file 31a containing content to be changed, the change settings command unit 40a thus sends a change settings command through the corresponding configuration port 55 in step SA7.

Note that to open the configuration port 55, the address, port number, communication protocol to use, and port name may be input by the user through a specific user interface, may be default values, or may be set automatically by acquiring specific information.

The settings changing unit 30b of each host computer 12 then receives the change settings command sent by the management server 14 using the configuration port 55 as described above (step SB2). Next, the settings changing unit 30b changes the content of the configuration file 31a corresponding to the configuration port 55 that was used based on the received change settings command (step SB3). The content of the configuration file 31a of each printer 11 selected by the user in step SA4 is thus changed.

A configuration port 55 is thus opened for each configuration file 31a on the host computer 12 in this embodiment. When changing the content of configuration files 31a stored on plural host computers 12, the management server 14 can systematically change each configuration file 31a in a single operation by sending change settings commands using the configuration port 55, which is a logical port, corresponding to each configuration file 31a. In other words, a complicated operation using manual means as in the related art is not required to change the configuration files 31a. More specifically, processing efficiency can be improved and ease of development can be improved because the content of a configuration files 31 can be reliably changed by a simple process of sending a change settings command using a configuration port 55.

As described above, the printing system 1 according to this embodiment includes a plurality of host computers 12 (control devices) that are connected to a printer 11 (printing device) and control the printer 11, and a management server (server device) connected to the host computers 12.

The host computer 12 has a print control unit 30a that generates control commands for printing by referencing a configuration file 31a in which printing-related settings information is written, and sends the commands to the printer 11 through a printing port 52, which is a logical port opened for sending data to the printer 11; and a settings changing unit 30b that, when a change settings command instructing changing the settings information in a configuration file 31a is input from the management server 14, changes the settings information based on the change settings command using a configuration port 55, which is a logical port separate from the printing port 52.

A management server 14 has a change settings command unit 40a that, for one or a plurality of specific host computers 12 selected from the connected host computers 12, generates a change settings command related to a configuration file 31a stored in each host computer 12, and sends the command to each host computer 12 through the configuration port 55 opened by each host computer 12.

Thus comprised, a dedicated configuration port 55 to which a change settings command is input from a server device is opened by the host computer 12 separately from the printing port 52 for outputting control commands for printer 11 control, and to change the content of configuration files 31a on plural host computers 12, the management server 14 can change the content of a configuration file 31a on each host computer 12 by sending a change settings command instructing changing the settings information of the configuration file 31a through the configuration port 55 opened by each host computer 12. As a result, when compared with the method of the related art whereby changes are made manually using manual means, the changes can be made more easily and in a shorter time on each host computer 12 having a configuration file 31a to be changed.

In this embodiment, the change settings command unit 40a of the management server 14 requests the connected host computers 12 to send information identifying the printers 11 connected to the host computers 12 before sending the change settings command, displays the information identifying the printers 11 received in response to the request in a format enabling selecting the desired information, and generates a change settings command for the configuration file 31a of the printer 11 corresponding to the selected information.

Thus comprised, user convenience is improved because the user can manually confirm the printers 11 corresponding to the configuration files 31a of content to be changed, and can identify the printers 11 corresponding to the configuration files 31a of content to be changed by the simple means of selecting the desired information from the information identifying the printers 11 displayed in a selectable manner instead of performing a complicated task of inputting to the management server 14 information identifying each printer 11.

The invention is described above with reference to a preferred embodiment thereof, but the invention is not limited thereto and can be modified and adapted in many ways without departing from the scope of the accompanying claims.

For example, the printer 11 has a thermal head, but a recording head using any desired recording method may be used. Furthermore, the function blocks shown in FIG. 2 can be achieved by the cooperation of hardware and software, and do not suggest a specific hardware configuration. Furthermore, the function of the function blocks of the host computer 12 and management server 14 may be handled by separate devices externally connected to these devices. The host computer 12 and management server 14 may also execute operations by running programs stored on externally connected recording media.

INDUSTRIAL APPLICABILITY

As described above, the invention is useful for changing the content of a configuration file stored by a control device easily and in a short time, and in a receipt printing system comprising plural sets of receipt printers and control devices, is useful for changing the content of the configuration files stored by plural control devices in a single operation.

REFERENCE SIGNS LIST 1 receipt printing system
11 printer (receipt printer)
12 host computer (control device)
14 management server (server device)
30 host control unit
30a print control unit
30b settings changing unit
31a configuration file
40 server control unit
40a change settings command unit
52 print port
55 configuration port

The invention claimed is:

1. A receipt printing system comprising a control device configured to control one or more connected receipt printers and a server device connected to the control device by a network, wherein:
the control device includes:
a port monitor configured to:
open one or more respective dedicated first logical ports for each of the one or more connected receipt printers, and
open one or more respective dedicated second logical ports, separate from any of the first logical ports, for each of one or more configuration files containing settings information related to printing, the one or more configuration files respectively associated with the one or more connected receipt printers;
a print control unit configured to generate a control command for printing by referencing one of the configuration files containing settings information related to printing, and send the control command to one of the receipt printers associated with the one of the configuration files using the dedicated first logical port associated with the one of the receipt printers;
a settings changing unit configured to change the settings information of one of the configuration files based on a change settings command instructing changing the settings information in the one of the configuration files responsive to receiving the change settings command from the server device through the dedicated second logical port associated with the one of the configuration files,
the server device includes a change settings command unit configured to generate the change settings command, which is related to the one of the configuration files stored in the control device, and an installed server-side port monitor configured to send the change settings command to the dedicated second logical port, and
the one of the configuration files and the associated dedicated second logical port are associated one-to-one, and the associated dedicated second logical port is only used to process the change settings command instructing changing the settings information in the one of the configuration files associated with the dedicated second logical port.

2. The receipt printing system described in claim 1, wherein:
the change settings command unit of the server device is configured to request the control device to send information identifying the one or more of the receipt printers connected to the control device, display the information identifying the one or more of the receipt printers received in response to the request in a format enabling selecting desired information, and generate the change settings command for the one or more configuration files related to the receipt printer corresponding to the selected information, prior to sending the change settings command.

3. The receipt printing system described in claim 1, wherein:
the settings information includes information indicating paper width, print speed, and top, bottom, left and right margin settings related to printing a receipt.

4. The receipt printing system described in claim 1, wherein:
the print control unit of the control device is configured to generate information related to an image to be printed on a receipt, and to generate the control command causing the one of the receipt printers to print a receipt based on the generated information; and
the receipt printer is configured to produce a receipt based on the control command sent from the control device.

5. The receipt printing system described in claim 4, wherein:
the server device comprises a database storing data for producing a receipt; and
the print control unit of the control device is configured to acquire the data for producing a receipt from the server device, and to generate information related to an image to be printed on the receipt based on the acquired data.

6. The receipt printing system described in claim 1, wherein:
the control device is configured to store a printer queue that temporarily stores the control command, the printer queue relating to a physical port to which the receipt printer is connected in the network.

7. The receipt printing system of claim 1, wherein:
the one or more connected receipt printers is a plurality of connected receipt printers respectively associated with a plurality of configuration files including the one or more configuration files; and
the port monitor is further configured to open a plurality of dedicated second logical ports, separate from any of the first logical ports, for each of plurality of configuration files containing settings information related to printing and respectively associated with the plurality of connected receipt printers.

8. A control method of a receipt printing system including a control device that controls one or more connected receipt printers, and a server device connected to the control device by a network, comprising:
a port monitor of the control device opening one or more dedicated first logical ports for communicating settings information for updating respective one or more configuration files for each of the one or more connected receipt printers, the one or more dedicated first logical ports respectively associated with the one or more configuration files on a one-to-one basis and only used to process one or more change settings commands instructing changing settings information in the one or more configuration files associated with the dedicated second logical port;
the server device generating the one or more change settings commands instructing changing settings information related to printing written in the one or more respective configuration files stored in the control device, and sending the one or more change settings commands to the control device using the one or more first dedicated logical ports in the network;
the control device changing the settings information based on the one or more change settings commands responsive to the one or more change settings commands being received from the server device through the one or more dedicated first logical ports;
the port monitor opening one or more dedicated second logical ports in the network for sending print commands; and
the control device sending a print command to one of the one or more connected receipt printers based on the changed settings information using one of the second dedicated logical ports.

9. The control method of a receipt printing system described in claim 8, wherein:
the settings information includes information indicating paper width, print speed, and top, bottom, left and right margin settings related to printing a receipt.

10. The control method of a receipt printing system described in claim 8, wherein:
a print control unit of the control device generates information related to an image to be printed on a receipt, and generates the print command causing the one of the receipt printers to print the receipt based on the generated information; and
the one of the receipt printers produces a receipt based on the print command sent from the control device.

11. The control method of a receipt printing system described in claim 8, wherein:
the server device stores data for producing a receipt; and
a print control unit of the control device acquires the data for producing a receipt from the server device, and generates information related to an image to be printed on the receipt based on the acquired data.

12. The control method of a receipt printing system described in claim 8, wherein:
the control device temporarily stores the print command to a printer queue, the printer queue relating to a physical port to which the one of the receipt printers is connected in the network.

13. The control method of a receipt printing system of claim 8, wherein:
the one or more connected receipt printers is a plurality of connected receipt printers respectively associated with a plurality of configuration files including the one or more configuration files; and
the port monitor is configured to open a plurality of dedicated first logical ports, separate from any of the second logical ports, for each of plurality of configuration files containing settings information related to printing and respectively associated with the plurality of connected receipt printers.

14. A control device that is connected to one or more receipt printers and is configured to control the one or more receipt printers, and is connected to a server device by a network, the control device comprising:
a port monitor configured to:
open one or more respective dedicated first logical ports for each of the one or more connected receipt printers for communication of one or more control commands for printing to the one or more connected receipt printers, and
open one or more respective second dedicated logical port separate from any of the one or more first logical ports, for each of one or more configuration files containing settings information related to printing and respectively associated with the one or more connected receipt printers on a one-to-one basis, the one or more second logical ports only used to process one or more change settings commands instructing changing settings information in the one or more configuration files associated with the dedicated one or more second logical ports;

a print control unit configured to generate one of the one or more control commands for printing by referencing one of the one or more configuration files containing settings information related to printing, and to send the one of the control commands to one of the receipt printers using one of the dedicated first logical ports, and a settings changing unit configured to change the settings information of one of the one or more configuration files responsive to receiving one of the one or more change settings commands instructing changing settings information in the one of the configuration files from the server device through one of the second logical ports associated with the one of the configuration files.

15. The control device described in claim 14, wherein:
the settings information includes information indicating paper width, print speed, and top, bottom, left and right margin settings related to printing a receipt.

16. The control device described in claim 14, wherein:
the print control unit of the control device is configured to generate information related to an image to be printed on a receipt, and to generate the one of the one or more control commands causing the one of the one or more receipt printers to print the receipt based on the generated information.

17. The control device described in claim 14, wherein:
the print control unit of the control device is configured to acquire data for producing a receipt from the server device, and to generate information related to an image to be printed on the receipt based on the acquired data.

18. The control device described in claim 14,
wherein the control device stores a printer queue that temporarily stores the control command, the printer queue relating to a physical port to which the receipt printer is connected in the network.

19. The control device of claim 14, wherein:
the one or more connected receipt printers is a plurality of connected receipt printers respectively associated with a plurality of configuration files including the one or more configuration files; and the port monitor is further configured to open a plurality of dedicated second logical ports, separate from any of the first logical ports, for each of plurality of configuration files containing settings information related to printing and respectively associated with the plurality of connected receipt printers.

* * * * *